(12) United States Patent
Lin et al.

(10) Patent No.: US 12,161,938 B2
(45) Date of Patent: Dec. 10, 2024

(54) SYSTEMS AND METHODS FOR GENERATING TAILORED GAME EVENT OPTIONS TO SPECTATORS

(71) Applicant: Activision Publishing, Inc., Santa Monica, CA (US)

(72) Inventors: Jason Lin, Petaluma, CA (US); Paul Derek Yan, Novato, CA (US); Michael James Stout, Novato, CA (US); Daniel Neil, San Francisco, CA (US); Brian Thomas Fricks, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 18/494,067

(22) Filed: Oct. 25, 2023

(65) Prior Publication Data

US 2024/0050860 A1     Feb. 15, 2024

Related U.S. Application Data

(63) Continuation of application No. 17/650,337, filed on Feb. 8, 2022, now Pat. No. 11,806,626, which is a
(Continued)

(51) Int. Cl.
| | |
|---|---|
| A63F 13/69 | (2014.01) |
| A63F 13/35 | (2014.01) |
| A63F 13/45 | (2014.01) |
| A63F 13/47 | (2014.01) |
| A63F 13/79 | (2014.01) |
| A63F 13/795 | (2014.01) |
| A63F 13/85 | (2014.01) |
| A63F 13/86 | (2014.01) |
| A63F 13/88 | (2014.01) |

(52) U.S. Cl.
CPC .............. *A63F 13/69* (2014.09); *A63F 13/35* (2014.09); *A63F 13/45* (2014.09); *A63F 13/47* (2014.09); *A63F 13/79* (2014.09); *A63F 13/795* (2014.09); *A63F 13/85* (2014.09); *A63F 13/86* (2014.09); *A63F 13/88* (2014.09)

(58) Field of Classification Search
None
See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Jason T Yen
(74) *Attorney, Agent, or Firm* — Novel IP

(57) ABSTRACT

Systems and methods enable most valuable players (MVPs) of a gameplay session to play a bonus gameplay session where other players (non-MVP players) participate as player-spectators in online video games and, through a collective voting mechanism or through active interaction, determine the occurrence of certain events or contents of the bonus gameplay in real time. In this manner, non-MVP players are able to directly affect the course of the bonus gameplay.

20 Claims, 8 Drawing Sheets

Related U.S. Application Data continuation of application No. 16/703,431, filed on Dec. 4, 2019, now Pat. No. 11,278,813, which is a continuation-in-part of application No. 16/054,507, filed on Aug. 3, 2018, now Pat. No. 10,596,471.

(60) Provisional application No. 62/775,667, filed on Dec. 5, 2018, provisional application No. 62/609,374, filed on Dec. 22, 2017.

(56) References Cited

U.S. PATENT DOCUMENTS

| | | | |
|---|---|---|---|
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |
| 5,736,985 | A | 4/1998 | Lection |
| 5,737,416 | A | 4/1998 | Cooper |
| 5,745,678 | A | 4/1998 | Herzberg |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |

(56) References Cited

U.S. PATENT DOCUMENTS

| | | |
|---|---|---|
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,496,531 B2 | 7/2013 | Youm |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,669,293 B1 | 6/2017 | Kornmann |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2003/0158827 A1 | 8/2003 | Ansari |
| 2004/0224741 A1 | 11/2004 | Jen |
| 2005/0049045 A1 | 3/2005 | Abe |
| 2005/0113158 A1* | 5/2005 | Sterchi ............... A63F 13/53 463/3 |
| 2005/0113164 A1 | 5/2005 | Buecheler |
| 2005/0161878 A1 | 7/2005 | Nally |
| 2005/0192097 A1 | 9/2005 | Farnham |
| 2005/0261062 A1 | 11/2005 | Lewin |
| 2006/0098013 A1 | 5/2006 | Wong |
| 2007/0060337 A1 | 3/2007 | Abe |
| 2007/0087835 A1 | 4/2007 | Van Luchene |
| 2007/0173323 A1 | 7/2007 | Johnson |
| 2007/0281285 A1 | 12/2007 | Jayaweera |
| 2008/0268943 A1 | 10/2008 | Jacob |
| 2009/0075738 A1 | 3/2009 | Pearce |
| 2009/0113448 A1 | 4/2009 | Smith |
| 2010/0304839 A1 | 12/2010 | Johnson |
| 2011/0117982 A1 | 5/2011 | Nguyen |
| 2011/0263312 A1 | 10/2011 | De Waal |
| 2012/0010734 A1 | 1/2012 | Youm |
| 2012/0094762 A1 | 4/2012 | Khan |
| 2012/0122552 A1 | 5/2012 | Youm |
| 2012/0142429 A1 | 6/2012 | Muller |
| 2012/0214585 A1 | 8/2012 | Paquet |

(56) References Cited

U.S. PATENT DOCUMENTS

| | | |
|---|---|---|
| 2012/0276992 A1 | 11/2012 | Moinuddin |
| 2012/0282995 A1 | 11/2012 | Allen |
| 2013/0252737 A1 | 9/2013 | Mescon |
| 2014/0004960 A1 | 1/2014 | Soti |
| 2014/0011595 A1 | 1/2014 | Muller |
| 2014/0113718 A1 | 4/2014 | Norman |
| 2014/0344725 A1 | 11/2014 | Bates |
| 2014/0364201 A1 | 12/2014 | Tanibuchi |
| 2015/0231502 A1 | 8/2015 | Allen |
| 2015/0273340 A1 | 10/2015 | Cudak |
| 2016/0001181 A1 | 1/2016 | Marr |
| 2016/0001184 A1 | 1/2016 | Sepulveda |
| 2016/0005270 A1 | 1/2016 | Marr |
| 2016/0067611 A1 | 3/2016 | Ware |
| 2016/0067612 A1 | 3/2016 | Ntoulas |
| 2016/0082350 A1 | 3/2016 | Bansi |
| 2016/0184708 A1 | 6/2016 | Ziaja |
| 2016/0191671 A1 | 6/2016 | Dawson |
| 2016/0346694 A1 | 12/2016 | Fisher |
| 2017/0001111 A1* | 1/2017 | Willette .............. A63F 13/49 |
| 2017/0072324 A1* | 3/2017 | Navok ............... A63F 13/847 |
| 2017/0252654 A1 | 9/2017 | Hong |
| 2018/0169515 A1 | 6/2018 | Rice |
| 2019/0070502 A1 | 3/2019 | Hirose |
| 2019/0102941 A1* | 4/2019 | Khan ................. G02B 27/017 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

SYSTEMS AND METHODS FOR GENERATING TAILORED GAME EVENT OPTIONS TO SPECTATORS

CROSS-REFERENCE

The present application is a continuation application of U.S. patent application Ser. No. 17/650,337, entitled "Systems and Methods for Incentivizing Player Participation in Bonus Game Play Sessions" and filed on Feb. 8, 2022, which is a continuation application of U.S. patent application Ser. No. 16/703,431, entitled "Systems and Methods for Enabling Audience Participation in Bonus Game Play Sessions", filed on Dec. 4, 2019, and issued as U.S. Pat. No. 11,278,813 on Mar. 22, 2022, which relies on U.S. Patent Provisional Application No. 62/775,667, of the same title and filed on Dec. 5, 2018, for priority.

U.S. patent application Ser. No. 16/703,431 is also a continuation-in-part application of U.S. patent application Ser. No. 16/054,507, entitled "Systems and Methods for Enabling Audience Participation in Multi-Player Video Game Play Sessions", filed on Aug. 3, 2018, and issued as U.S. Pat. No. 10,596,471 on Mar. 24, 2020, which relies on U.S. Patent Provisional Application No. 62/609,374, of the same title and filed on Dec. 22, 2017, for priority. The aforementioned applications are incorporated herein by reference in their entirety.

FIELD

The present specification is related generally to the field of video gaming, animation and computer graphics. More specifically, the present specification is related to a system and method for selecting a specific player from a group of players, providing the specific player with an additional gameplay session, and enabling the remaining group of players to influence or affect the game events in the additional gameplay session.

BACKGROUND

The proliferation of reliable and affordable broadband services allows for a greater number of people to enjoy computer or video games of various genres. For example, in some computer games, players conquer territories or complete other missions for ever-increasing rewards. In many role-playing games (RPG) or first-person shooter (FPS) games, each player controls the actions of at least one character. In addition, players develop unique characters and, by controlling the actions of the characters they create during gameplay, the players (via their characters) accumulate various objects and abilities through extended play. The rules for how quickly, how many, or what type of abilities or objects a character may earn or gain usually involves several ratings or statistics. These ratings determine the outcome of various chance or future events that lead to new objects and abilities.

Along with the popularity of online gaming, demand for live streaming or pre-stored replays of video gameplay sessions has grown. Furthermore, many gamers are increasingly sharing their gameplay through social networks. In many game titles or genres, a video game player may compete against another player either in person or via an online platform. Many online games offer leaderboards which allow a player to judge how a particular game play session compared against other game players. Most leaderboards measure a level achieved and certain standard statistics, such as the amount of time played to achieve the level. Simple performance metrics are often used to display basic statistics on performance. Examples of such metrics include the number of kills, kill/death ratio, scores, achievements, timings, and levels passed. This data is sent by the game client running on the player's home console or personal computer (PC) to the leaderboards service hosted at the back end of the gaming system.

Retention, namely the frequency by which a player engages in a video game, is a critical characteristic of a video game and is often determinative of the overall success of the video game. Video games integrate numerous mechanisms for maintaining or increasing retention. For example, some video games offer bonus gameplay, which is a supplementary level for players to play. The bonus gameplay is usually designed to reward, or incentivize, a player for some achievement and enables the player to collect extra points, coins, awards, power-ups, or other benefits. Bonus gameplay is conventionally offered at the end of a video game or at least at the completion of certain stages of the video game. However, bonus gameplays often fail to retain players whose performance may not be exceptional and discourages such players from continuing to engage with the video game.

Accordingly, there is a need for systems and methods that maximize player engagement and retention and improve the experience of playing video games. There is also a need for systems and methods that incentivize and reward exceptional player performance, while still engaging those other players who fail to achieve the performance required for access to the additional gameplay. Furthermore, there is a need for systems and methods that allow all players to remain engaged and active in a game while concurrently recognizing those players who have performed exceptionally well and, therefore, deserve special rewards. Finally, there is a need for methods and systems of selecting a specific player, from a group of players, to receive a reward while still enabling the remaining players to remain engaged with the video game, and therefore, maintaining retention of the non-rewarded players.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a method for generating a bonus gameplay session and incorporating at least one input from at least one non-most valuable player (non-MVP) player into the bonus gameplay session being played by at least one most valuable player (MVP), wherein the at least one MVP comprises a player having met a predefined criterion in a multi-player video game gameplay session completed prior to the bonus gameplay session and the at least one non-MVP player comprises any player in the multi-player video game gameplay session that is not the MVP, wherein the bonus gameplay session is at least partially generated by a computer system and at least partially transmitted to a plurality of end user devices and wherein the computer system includes one or more processors executing a video game streaming application for generating and streaming the gameplay session, the method comprising: determining if a threshold number of the non-MVP players exists to trigger a generation of a plurality of game event options for potential inclusion in the bonus gameplay session; based on said determination, generating the plurality of game event options; transmitting data indicative of a user interface to at least some of the end user devices, wherein, when executed by at least some of the end user devices, the user interface presents the generated plurality of game event options and receives non-MVP player inputs indicative of a desire to include at least one of the plurality of game event options into the gameplay session; determining a function of the non-MVP player inputs; selecting at least one of the plurality of game event options based on the function of the non-MVP player inputs; and incorporating the selected at least one of the plurality of game event options into a data stream representative of the bonus gameplay session.

Optionally, the at least one non-MVP player comprises a teammate of the at least one MVP from the multi-player video game gameplay session or a player from an opposing team of the at least one MVP from the multi-player gameplay session.

Optionally, the threshold number of non-MVP players is at least one.

Optionally, the non-MVP players include individuals participating in the bonus gameplay session remotely on at least some of the end user devices.

Optionally, the non-MVP players include individuals participating in the bonus gameplay session live at a competitive video gaming event.

Optionally, the plurality of game event options includes an occurrence of one or more earthquakes, meteor showers, storms, rain, wind, fires, lightning, or other natural disasters.

Optionally, the plurality of game event options includes an occurrence of available items for purchase during the bonus gameplay session.

Optionally, the plurality of game event options includes a timing and content of supplies and rewards available to specific players in the bonus gameplay session.

Optionally, the plurality of game event options includes a placement or existence of armor, weapons, treasure, or other resources available to specific players in the bonus gameplay session.

Optionally, the plurality of game event options includes placement or existence of hazards, threats, or challenges presented to the most valuable players in the bonus gameplay session.

Optionally, the plurality of game event options includes changes in a layout of a bonus game map.

Optionally, the plurality of game event options is randomly generated.

Optionally, the plurality of game event options are generated to benefit the at least one MVP based on a number of non-MVP players supporting, or opposing, the at least one MVP.

Optionally, the method further comprises iteratively generating a new plurality of game event options depending on events occurring within the bonus gameplay session and the selected at least one of the plurality of game event options previously incorporated into the data stream representative of the bonus gameplay session. Still optionally, iteratively generating the new plurality of game event options includes generating game event options that were not historically presented to the non-MVP players.

In some embodiments, the present specification discloses a system for generating a bonus gameplay session and incorporating at least one input from at least one non-most valuable player (non-MVP) player into the bonus gameplay session being played by at least one most valuable player (MVP), wherein the at least one MVP comprises a player meeting a predefined criterion in a multi-player video game gameplay session completed prior to the bonus gameplay session and the at least one non-MVP player comprises any player in the multi-player video game gameplay session that is not the MVP, wherein the system comprises a computer system for at least partially generating the bonus gameplay session and transmitting it to a plurality of end user devices and wherein the computer system includes one or more processors executing a video game streaming application for generating and streaming the bonus gameplay session and executing a non-MVP player input application, wherein, when executed, the non-MVP player input application: determines if a threshold number of non-MVP players exists to trigger a generation of a plurality of game event options for potential inclusion in the bonus gameplay session; based on said determination, generates the plurality of game event options; transmits data indicative of a user interface to at least some of the end user devices, wherein, when executed by at least some of the end user devices, the user interface presents the generated plurality of game event options and receives non-MVP player inputs indicative of a desire to include at least one of the plurality of game event options into the bonus gameplay session; determines a function of the non-MVP player inputs; selects at least one of the plurality of game event options based on the function of the non-MVP player inputs; and causes the selected at least one of the plurality of game event options to be incorporated into a data stream representative of the bonus gameplay session.

Optionally, the at least one non-MVP player comprises a teammate of the at least one MVP from the multi-player video game gameplay session or a player from an opposing team of the at least one MVP from the multi-player gameplay session.

Optionally, the threshold number of non-MVP players is at least one.

Optionally, the plurality of game event options includes an occurrence of one or more earthquakes, meteor showers, storms, rain, wind, fires, lightning, or other natural disasters.

Optionally, the plurality of game event options includes an occurrence of available items for purchase during the bonus gameplay session.

Optionally, the plurality of game event options includes a timing and content of supplies and rewards available to specific players in the bonus gameplay session.

Optionally, the plurality of game event options includes a placement or existence of armor, weapons, treasure, or other resources available to specific players in the bonus gameplay session.

Optionally, the plurality of game event options includes placement or existence of hazards, threats, or challenges presented to the players in the bonus gameplay session.

Optionally, the plurality of game event options includes changes in a layout of a bonus game map.

Optionally, the non-MVP player input application is configured to randomly generate the plurality of game event options.

Optionally, the non-MVP player input application is configured to generate the plurality of game event options to benefit a player of the bonus gameplay session based on a number of non-MVP players supporting, or opposing, the player.

Optionally, when executed, the non-MVP player input application is configured to iteratively generate a new plurality of game event options depending on events occurring within the bonus gameplay session and the selected at least one of the plurality of game event options previously incorporated into the data stream representative of the bonus gameplay session. Optionally, the iterative generation of the new plurality of game event options includes generating game event options that were not historically presented to the non-MVP players.

In some embodiments, the present specification discloses a method for generating a bonus gameplay session to be played by at least one most valuable player (MVP), wherein the at least one MVP comprises a player having met a predefined criterion in a multi-player video game gameplay session completed prior to the bonus gameplay session and a number of non-MVP players, wherein each non-MVP player comprises any player in the multi-player video game gameplay session that is not the MVP, wherein the bonus gameplay session is at least partially generated by a computer system and at least partially transmitted to a plurality of end user devices and wherein the computer system includes one or more processors executing a video game streaming application for generating and streaming the gameplay session, the method comprising: displaying the at least one MVP on a game screen; loading a bonus gameplay session and transferring all players to the bonus gameplay session; waiting a predetermined period of time for all players to connect to the bonus gameplay session; incentivizing the at least one MVP to participate in the bonus gameplay session; and incentivizing each non-MVP player to participate in the bonus gameplay session.

Optionally, the non-MVP player comprises a teammate of the at least one MVP from the multi-player video game gameplay session or a player from an opposing team of the at least one MVP from the multi-player gameplay session.

Optionally, the number of non-MVP players is one or more.

Optionally, the number of non-MVP players is zero.

Optionally, the predetermined period of time is in a range of 1 to 60 seconds.

Optionally, the predetermined period of time is 30 seconds.

Optionally, the non-MVP players include individuals participating in the bonus gameplay session remotely on at least some of the end user devices.

Optionally, the non-MVP players include individuals participating in the bonus gameplay session live at a competitive video gaming event.

Optionally, the at least one MVP and each non-MVP player can utilize an in-game menu to opt out of the bonus gameplay session during the predetermined period of time and during the bonus gameplay session.

Optionally, the method further comprises prompting the at least one MVP and each non-MVP player with at least one message to incentivize the at least one MVP and each non-MVP player to remain in the bonus gameplay session.

Optionally, incentivizing the at least one MVP to participate in the bonus gameplay session comprises providing rewards to the at least one MVP for achievements completed during the bonus gameplay session.

Optionally, the at least one MVP is required to participate in the bonus gameplay session through the conclusion of the bonus gameplay session in order to receive the rewards.

Optionally, the at least one MVP is required to participate in at least a portion of the bonus gameplay session in order to receive a portion of the rewards.

Optionally, the at least one MVP earns an initial reward before the start of the bonus gameplay session.

Optionally, incentivizing each non-MVP player to participate in the bonus gameplay session comprises providing rewards to each non-MVP player for interacting with the at least one MVP player during the bonus gameplay session.

Optionally, interacting with the at least one MVP player during the bonus gameplay session comprises hindering the gameplay of the at least one MVP player during the bonus gameplay session.

Optionally, interacting with the at least one MVP player during the bonus gameplay session comprises assisting the gameplay of the at least one MVP player during the bonus gameplay session.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1A:
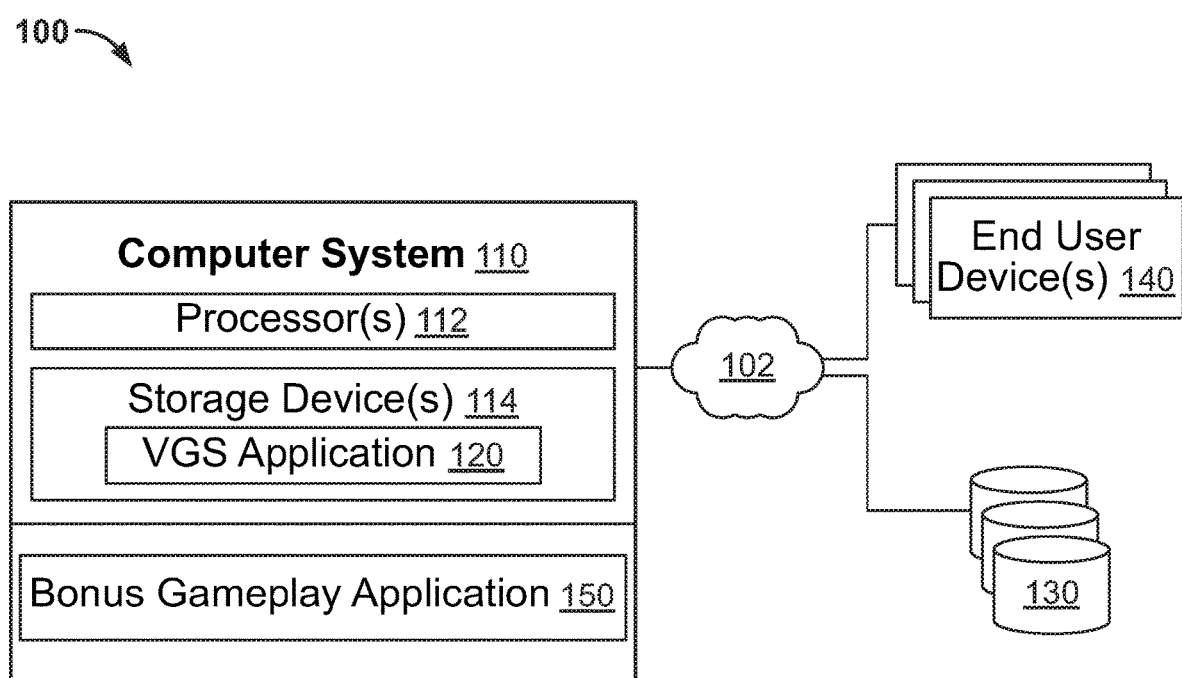
FIG. 1A illustrates an exemplary system of generating and distributing video game streams, according to an embodiment of the specification.

The present specification describes systems and methods that select one or more players from a group of players of a multi-player game and provide a bonus game or games to those selected player(s) after the completion of the multi-player game or a stage of the multi-player game. Preferably, the selected player(s) are the highest achieving or ranking player(s), or Most Valuable Player(s) (MVP(s)), and are thereby rewarded for that achievement by engaging in the bonus game while other player(s), namely those players other than the MVP(s), are able to participate as spectators, either actively by introducing or changing game elements during bonus gameplay, or through a collective voting mechanism prior to or during the bonus game(s), to determine the occurrence, in real time, of certain events or contents of the bonus gameplay. MVP(s) are assessed through multiple criteria during a multi-player game. The MVP may be a single player, may be multiple players that meet specific criteria of the game, or may be a team of players.

Embodiments of the present specification provide a bonus game to be played by the MVP(s) after a multi-player gameplay session. In one embodiment, the present systems and methods generate gaming events that are inserted into a video game stream of the bonus game, thereby directly affecting the events, actions, course, objects, resources, or other elements of a real-time bonus gameplay session. Operationally, in some embodiments, a plurality of bonus game event options are generated by the present system and presented to the MVP(s). The MVP(s) may then select various options for the bonus game, including, but not limited to, game type or genre and game modifiers, such as weapons, power-ups, and obstacles. In some embodiments, the system selects the options for the bonus game without input from the MVP(s). In some embodiments, the system selects these options randomly. In some embodiments, the system selects these options based on the performance of one or more players in the preceding multi-player game.

Additionally or alternatively, in some embodiments, a plurality of bonus game event options are generated by the present system and presented to at least one non-MVP player. The at least one non-MVP player may then select various options for the bonus game, including, but not limited to, game type or genre and game modifiers, such as weapons, power-ups, and obstacles. In some embodiments, the system selects the options for the bonus game without input from the at least one non-MVP player. In some embodiments, the system selects these options randomly. In some embodiments, the system selects these options based on the performance of one or more players in the preceding multi-player game.

Additionally or alternatively, in some embodiments, a specific one or more of the plurality of game event options is selected based on a collective vote of a plurality of non-MVP players, which include players from the gameplay session that precede the bonus gameplay session. In some embodiments, collective voting occurs after completion of the multi-player game and before initiation of the bonus game. In some embodiments, collective voting occurs after completion of the multi-player game and both before and during the bonus game. Voting occurring during the bonus game causes the system to generate game events during active bonus gameplay.

Once selected by the MVP(s), at least one non-MVP player, the system, or a combination of at least two of: the MVP(s); at least one non-MVP player; and, the system, the specific one or more of the plurality of game event options are then generated as actual gaming events and incorporated into a Video Game Stream ("VGS") that is transmitted to the MVP(s) as part of a bonus gameplay session. The MVP(s) then plays the bonus game as a single player. In some embodiments, in addition or alternatively to choosing and voting on options in advance of the bonus gameplay, as described above, the at least one non-MVP player may actively affect the gameplay of the bonus game during gameplay. In some embodiments, the at least one non-MVP player can present obstacles or distractions to the MVP(s). For example, in a racing game, the at least one non-MVP player can throw pies or logs at or place ink splotches in front of a race car controlled by the MVP(s). In another example, in a First Person Shooter (FPS) game, the at least one non-MVP player can select the type of enemies the MVP(s) faces. In this manner, players other than MVP(s) become player-spectators and are able to directly affect the course of bonus gameplay. In another embodiment, the present specification provides methods and systems to encourage more participation and response from all the players, and provides additional incentives and benefits to the MVP(s). In some embodiments, incentives are related to long term game currencies. In some embodiments, the long term currencies may be used for purchasing additional in-game content including, but not limited to, game cosmetics, such as player skins.

For purposes of this specification, the term MVP shall refer to an individual player who, in the course of a given multi-player gameplay session, qualifies as a most valuable player. The term MVPs shall refer to a group of players who, in the course of a given multi-player gameplay session, qualify as the most valuable players. Such an individual player or group of players may be determined to be so qualified, and therefore differentiated from other players who are participating in the same multi-player gameplay session, by a plurality of performance metrics, as further described herein.

For purposes of this specification, players engaging in the same gameplay sessions, other than the MVP(s), are referred to hereinafter as "non-MVP players". Non-MVP players shall include all individuals who have participated in a multi-player game that preceded the bonus game and are identified as players other than the MVP(s) based on their performance in the multi-player game. The non-MVP players may or may not be actively playing and/or voting in a bonus gaming session offered to and played by the MVP(s). In some embodiments, non-players (neither MVP(s) or non-MVP players) may include spectators of the game who have not participated in the multi-player game that gave rise to the bonus gameplay session. The MVP(s), non-MVP players, and non-players may be attending a live bonus gaming event in person or playing/viewing the live gaming event remotely. In some embodiments, the MVP(s) are also capable of voting for bonus gameplay options. In some embodiments, the non-players are also capable of voting for bonus gameplay options.

The term "bonus gameplay session" refers to a gameplay session that is only offered, or otherwise accessible, to one or more players (MVPs) based on the players' performance, relative to other players, in a preceding gameplay session. Accordingly, a bonus gameplay session is differentiated from a subsequent level, stage, phase, or round in a conventional video gameplay session in that access to such a bonus gameplay session is at least a function of how well a given player performs relative to other players, and not necessarily solely based on objectively meeting certain game objectives. Therefore, an objectively high performing player and an objectively low performing player may both access a bonus gameplay session if, in the course of their separate gameplay sessions, they both performed better than the other players in their gameplay sessions. For example, a player on a losing team of a team based multi-player gameplay session may still be considered the MVP if that player out-performed all other players in in all other teams in the multi-player gameplay session.

The term "game event options" refers to programmatically generated events, actions, objects, or resources of a real-time bonus gameplay session and may include any element that is experienced by a player of a bonus gameplay session, such as, but not limited to, the type of weapon that will appear next in a bonus gameplay session, the occurrence of natural disasters or other "acts of God" (e.g., earthquakes, meteor showers, storms, rain, wind, fires, lightning, or other natural disasters), the occurrence of available items for purchase during a bonus gameplay session, the timing and content of supplies and rewards, the placement or existence of armor, weapons, treasure, or other resources, the placement or existence of hazards, threats, or challenges, the placement or existence of random destructive events, whether any of the above are applied to, or made available to, MVP(s) and changes in the layout of the bonus game map.

The term "elected game event" refers to those game event options that have been elected by a collective vote, decision, or selection by the non-MVP players.

The term "Video Game Stream" refers to a programmatically generated data stream that, when executed by a client device or end user device, generates a gameplay session, such as a bonus gameplay session.

While aspects of the invention may be described herein with reference to particular types of video game genres, the systems and methods described in detail herein may be used in any genre of a multiplayer video game, including where audience members choose to watch the multi-player video game in person or via an online platform or where former players become spectators once they are out of the game and waiting for a bonus gameplay session to finish.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise. The disclosed inventions are directed to an improvement in computer-related technology, namely enabling non-MVP players to affect the progress and occurrence of events in video gameplay sessions, thereby increasing non-MVP player interest and viewing of video gameplay sessions. In particular, the present specification discloses specific teachings regarding how the claimed inventions enable integrating non-MVP player involvement in a video gameplay session. Accordingly, Applicant's claimed inventions do not preempt all approaches to managing the relations between parties and, instead, are directed to an improvement in video gaming technology grounded firmly in a specific way of achieving the desired outcome of having non-MVP players effect, in real-time, the progress and occurrence of events in video gameplay sessions.

To the extent the claimed inventions are still considered to be "abstract" in nature, it should be appreciated that each of the claim limitations, when viewed as an ordered combination, amount to significantly more than just an abstract idea or concept. The methods and systems of the present invention represent technical improvements to a form of computer technology, video games, by providing a specialized computer system configured to host a plurality of concurrently executing video game streaming applications (for example, anywhere from at least 10 video game streaming applications to at least 100,000,000 video game streaming applications or any increment therein), host a plurality of client devices associated with remotely located MVP(s), non-MVP players, and non-players (for example, anywhere from at least 10 client devices associated with MVP(s), non-MVP players, and non-players to at least 100,000,000 client devices associated with MVP(s), non-MVP players, and non-players or any increment therein), and perform a series of programmatic steps designed to generate electronic user interfaces that present a plurality of game event options, which are specific to the video game applications, receive inputs from the non-MVP players indicative of a desire to include at least one of the plurality of game event options into the bonus gameplay session, and incorporate the selected game event options into a data stream representative of the bonus gameplay session.

Exemplary System Architecture

FIG. 1A illustrates an exemplary system 100 of generating and distributing video game streams, according to an implementation of the present specification. In one implementation, system 100 may include a computer system 110, one or more databases 130, one or more end user devices 140 in communication with the computer system 110 over a network 102, and/or other components.

Computer System 110

In one embodiment, computer system 110 may be configured as a server (e.g., having one or more server blades, processors, and other server components as are known to those of skill in the art), a gaming console, a handheld gaming device, a personal computer (e.g., a desktop computer, a laptop computer, and the like), a smartphone, a tablet computing device, and/or other device that is programmed to encode, decode, and/or distribute game streams as described herein.

Computer system 110 may include one or more processors 112 (also interchangeably referred to herein as processors 112, processor(s) 112, or processor 112 for convenience), one or more storage devices 114 (which may store a VGS application 120), and/or other components. Processors 112 may be programmed by one or more computer program instructions. For example, processors 112 may be programmed by video game stream application 120 and/or other instructions. VGS application 120 may include various instructions that program computer system 110. As described herein, VGS application 120 will be described as programming computer system 110 to perform various operations. However, it should be understood that a portion (or all) of VGS application 120 may, alternatively or additionally, program other system components (e.g., end user device 140) to perform at least some of the functions of VGS application 120.

End User Devices 140

In one embodiment, end user device 140 may be configured as a gaming console, a handheld gaming device, a personal computer (e.g., a desktop computer, a laptop computer, and the like), a smartphone, a tablet computing device, and/or other device that can be programmed to present a video game to be played, view a video game replay, encode a game log, generate a metadata track, and/or perform other functions described herein. Although not illustrated in FIG. 1A, end user devices 140 may include one or more physical processors programmed by computer program instructions. For example, end user device 140 may be programmed by all or a portion of VGS application 120.

Although illustrated in FIG. 1A as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1A as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

Databases 130

The various databases 130 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1A may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1A, as well as in other drawing figures, different numbers of entities than those depicted may be used. Furthermore, according to various implementations, the components described herein may be implemented in hardware and/or software that configure hardware.

Bonus Gameplay Application 150

A bonus gameplay application 150 determines the Most Valuable Player(s) (MVP(s)) from a multi-player gameplay session. The MVP(s) may be determined using a single criterion or multiple criteria. In one embodiment, the MVP is the winner of the multi-player game. In another embodiment, the MVP is the player scoring the highest score in the multi-player game. In yet another embodiment, the MVP is the player having the fastest time of achieving its objectives in the multi-player game, such as, for example, in a racing game, the player having the fastest race time is the MVP. In another embodiment, in a First Person Shooter (FPS) game, the player with the most kills is the MVP. In another embodiment, in a First Person Shooter (FPS) game, the three players with the top three most kills or scores are the MVPs. In another embodiment, the player in a multi-player game with the highest votes from fans is the MVP. In another embodiment, the player in a multi-player game that has the least deaths is the MVP. In some other embodiments, the MVP is determined based on a combination of multiple criteria, such as but not limited to, the embodiments stated herein. Embodiments of the present specification determine the MVP(s) toward the end of the multi-player gameplay session. In embodiments, the application 150 determines a single MVP. In other embodiments, the application determines multiple MVPs. In one embodiment, players with a predetermined number of highest scores, such as three, are determined as the MVPs. In another embodiment, players of a winning team of the multi-player game are determined as the MVPs.

The bonus gameplay application 150 is configured to access the database comprising the requisite data, such as number of kills, time, scores, points, coins, treasure, votes, or other characteristics, and process said data to determine the MVP(s) in accordance with the predefined criteria. Once one or more MVP(s) are identified, the bonus gameplay application 150 generates an interface that is provided to the MVP(s) and comprises an offer to engage in bonus gameplay. In some embodiments, the interface is also presented to the non-MVP players for voting purposes or for viewing. The bonus gameplay session commences after the preceding multi-player gameplay session. In embodiments, the bonus gameplay is of a different genre from its preceding gameplay session. For example, the bonus game could be a single player racing game, a puzzle game, or a platformer, while the preceding multi-player gameplay may have been a sports game or a FPS game. In other embodiments, the bonus gameplay is of the same genre of the preceding multi-player game. All players from the preceding multi-player game that are not determined as the MVP(s) are considered as 'non-MVP players' by the system for the bonus gameplay.

Additionally, the bonus gameplay application 150 may communicate with the standard gameplay that precedes the bonus gameplay, to offer players with options to pre-select certain equipment or items to be used during the bonus gameplay. For example, the players may select a particular type of armor, weapon, vehicle, power-up, or any other object to be used in the event that the player earns the MVP spot at the end of the standard gameplay. In addition to weapons/power-ups, the player could also select a level to be used in the bonus gameplay in the event that the player earns the MVP spot. In some embodiments, the options may be selected by both the MVP(s) and non-MVP players. In other embodiments, only the MVP(s) may select the options. In still other embodiments, only the non-MVP players may select the options. In some embodiments, the system selects the options randomly or based on player performance in the preceding multi-player game. In some embodiments, options are selected by the players before the start of the bonus game. In other embodiments, options are selected by the players both before and during the bonus game. In various embodiments, options are selected according to a combination of any of the above scenarios.

Figure 1B:
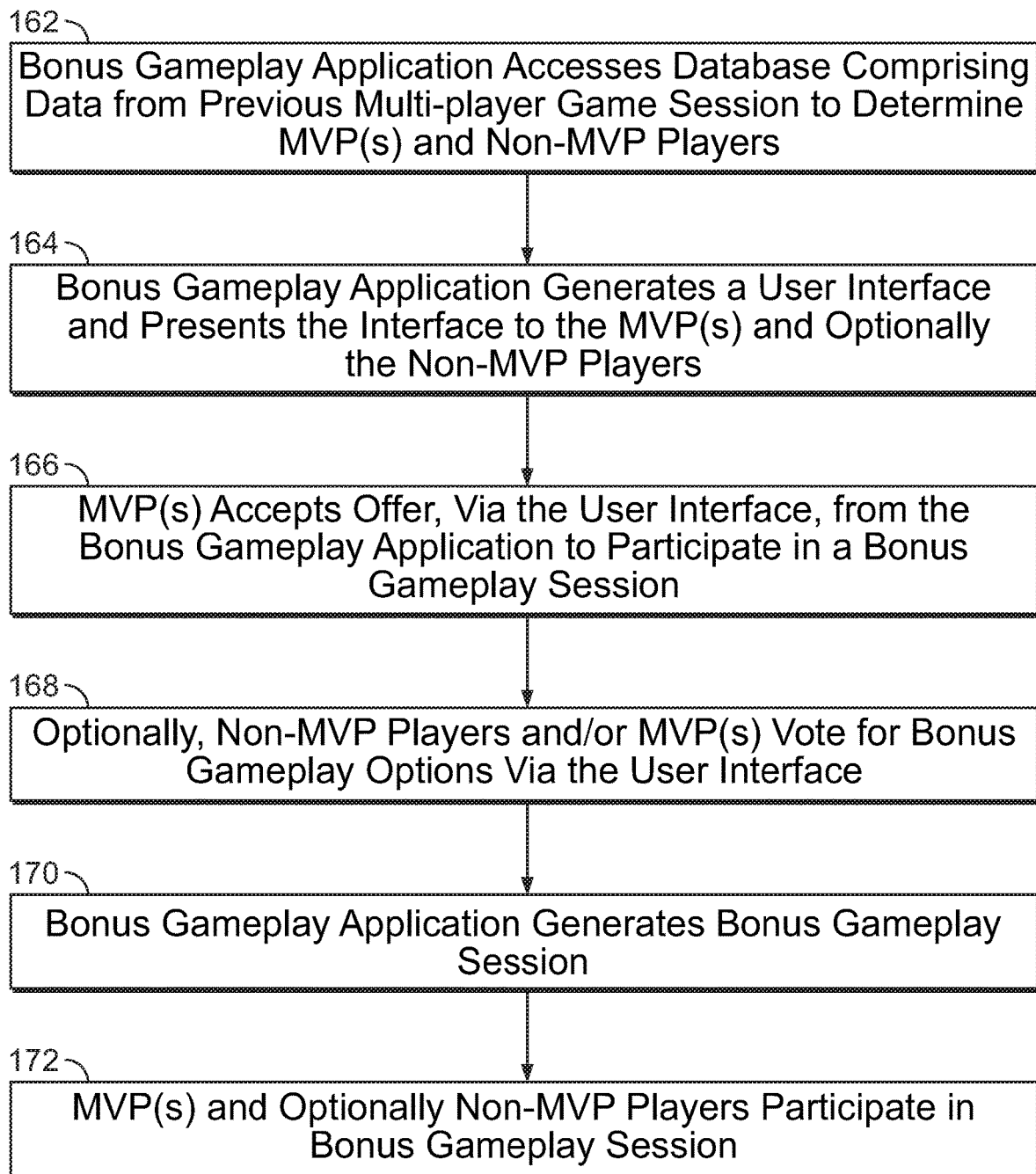
FIG. 1B is a flowchart illustrating the steps involved in a method of a bonus gameplay application determining how and when a bonus gameplay session user interface is provided to a user, in accordance with one embodiment of the present specification.

FIG. 1B is a flowchart illustrating the steps involved in a method of a bonus gameplay application determining how and when a bonus gameplay session user interface is provided to a user, in accordance with one embodiment of the present specification. At step 162, the bonus gameplay application accesses a database comprising data from a previous multi-player game session to determine the MVP(s) and non-MVP players. The bonus gameplay application generates a user interface and presents the interface to the MVP(s) at step 164. Optionally, in some embodiments, the bonus gameplay application also presents the user interface to the non-MVP players, for voting purposes and/or for general viewing. At step 166, the MVP(s) accepts an offer, via the user interface, from the bonus gameplay application to participate in a bonus gameplay session. Optionally, at step 168, the non-MVP players and, in some embodiments, the MVP(s) vote for bonus gameplay options or elements via the user interface. Then, at step 170, the bonus gameplay application generates a bonus gameplay session, based on the determination of MVP(s) and non-MVP players at step 162 and, optionally, bonus gameplay elements voted on at step 168. The MVP(s) participates in the bonus gameplay session at step 172. Optionally, the non-MVP players also participate in the bonus session gameplay, for example, in some embodiments, by placing obstacles or hindrances to the MVP(s) during gameplay.

Figure 1C:
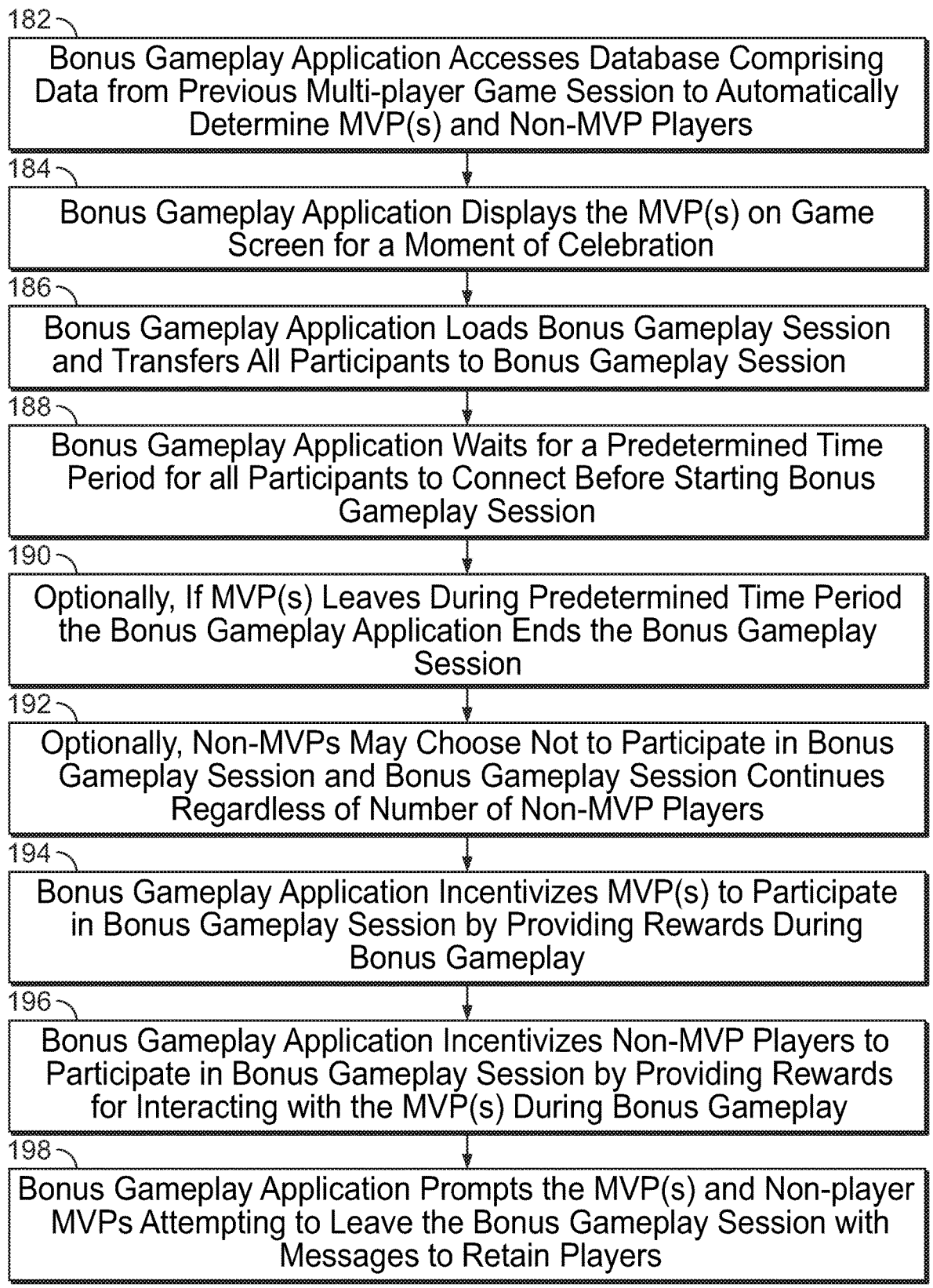
FIG. 1C is a flowchart illustrating the steps involved in a method of a bonus gameplay application generating a bonus gameplay session and incentivizing an MVP(s) and non-MVP players to participate in the bonus gameplay session, in accordance with one embodiment of the present specification.

FIG. 1C is a flowchart illustrating the steps involved in a method of a bonus gameplay application generating a bonus gameplay session and incentivizing an MVP(s) and non-MVP players to participate in the bonus gameplay session, in accordance with one embodiment of the present specification. At step 182, the bonus gameplay application accesses a database comprising data from a previous multi-player game session to automatically determine the MVP(s) and non-MVP players. At step 184, the bonus gameplay application displays the MVP(s) on the game screen for a moment of celebration, indicating to all players the MVP(s). The bonus gameplay session loads the bonus gameplay session and transfers all participants to the bonus gameplay session at step 186. In some embodiments, there is no voting or choices to be made by the MVP(s) or non-MVP players. In other words, the bonus gameplay application automatically chooses the genre and game of the bonus gameplay session and automatically transfers all MVP(s) and non-MVP players into the bonus gameplay session. By not providing voting options to the players, the bonus gameplay application intrinsically implies all players will be participating in the bonus gameplay session and removes the pressure of needing to make choices from the players. In other embodiments, the MVP(s) and non-MVP players may vote on bonus gameplay elements as described in the present specification. At step 188, the bonus gameplay application waits for a predetermined period of time for all participants to connect to the bonus gameplay session before staring the bonus gameplay session. In some embodiments, the predetermined time period is within a range of 1 to 60 seconds. In one embodiment, the predetermined time period is 30 seconds. During this time period, the MVP(s) and non-MVP players may opt out of the bonus gameplay session. Optionally, at step 190, if the MVP(s) leaves during the predetermined time period, the bonus gameplay application ends the bonus gameplay session (bonus gameplay session is not started). Optionally, at step 192, non-MVP players may choose to not participate in the bonus gameplay session. The bonus gameplay session continues regardless of the number of non-MVP players. In some embodiments, even if all non-MVP players opt out of the bonus gameplay session and the number of the non-MVP players is zero, the bonus gameplay application still starts the bonus gameplay session for participation by only the MVP(s).

Once the bonus gameplay session is active, the bonus gameplay application incentivizes the MVP(s) and non-MVP players to participate in the bonus gameplay session by providing rewards during the bonus gameplay session and at the completion of the bonus gameplay session. At step 194, the bonus gameplay application incentivizes the MVP(s) to participate in the bonus gameplay session by providing rewards during the bonus gameplay session. In some embodiments, rewards are provided to the MVP(s) based on performance during the bonus gameplay session. For example, in some embodiments, rewards are provided based on the MVP(s) completing specific gameplay objectives and/or achieving a predetermined score in the bonus gameplay session. Gameplay objectives may include, but are not limited to, in some embodiments, completing a level(s) of bonus gameplay, finishing a course in a racing game, having a specific completion time in a racing or platforming game, and achieving a specific number of 'kills' in a first or third person shooter game. In some embodiments, rewards earned by the MVP(s) are accrued by the bonus gameplay application and only provided to the MVP(s) if the MVP(s) participates in the bonus gameplay session through the conclusion of the bonus gameplay session. In some embodiments, the MVP(s) loses all rewards earned during the bonus gameplay session if the MVP(s) leaves the bonus gameplay session before the conclusion of the bonus gameplay session. In some embodiments, the bonus gameplay application provides an initial reward to the MVP(s) once the MVP(s) is determined, regardless if the MVP(s) participates in any or all of the bonus gameplay session. In embodiments, the initial reward is comparatively low relative to rewards possible to earn during the bonus gameplay session. For example, in one embodiment, the initial reward comprises a predetermined amount of in-game currency and the total reward possible to earn during bonus gameplay session comprises in-game currency at an amount 20 to 100 times greater than the initial reward amount. In some embodiments, if the MVP(s) participates in some of the bonus gameplay session but not the entire bonus gameplay session through conclusion, the bonus gameplay application provides the MVP(s) a partial amount of rewards earned during bonus gameplay based on the amount of time the MVP(s) participated in the bonus gameplay session.

At step 196, the bonus gameplay application incentivizes non-MVP players to participate in the bonus gameplay session by providing rewards to the non-MVP players for interacting with the MVP(s) during bonus gameplay. For example, in some embodiments, in a racing bonus gameplay session, the MVP(s) will be collecting rewards along the route while dodging incoming obstacles. Non-MVP players can choose to increase the difficulty of the gameplay for the MVP(s) by throwing more obstacles at the MVP(s) to increase the MVP(s) difficulty to maneuver. In some embodiments, for every successful obstruction presented by the non-MVP players to the MVP(s), in other words, the MVP(s) is hindered by the obstruction, the bonus gameplay application rewards the non-MVP players. In some embodiments, non-MVP players can choose to collaborate with the MVP(s). For example, in a racing game, non-MVP players can reveal secret passages for the MVP(s) to take to improve their race time. In some embodiments, every reward the MVP(s) collect in the secret passage and/or the improvement in race time for the MVP(s) by taking the secret passage will result in the bonus gameplay application providing a reward to the non-MVP players who revealed the secret passage.

In some embodiments, at step 198, when the MVP(s) or non-MVP players attempt to leave or opt out of the bonus gameplay session (for example, by selecting to leave the bonus gameplay session via an in-game menu), the bonus gameplay application prompts the player with a message to incentive them to stay in the game before allowing them to confirm they wish to leave. For example, in some embodiments, the bonus gameplay application prompts both the MVP(s) and non-MVP players with a message stating "You will be missing out this cool experience!" if they try to leave the session. Specifically, in some embodiments, the bonus gameplay application prompts the MVP(s) with a message stating "If you leave now, you will be missing up to X currencies." wherein X is defined as the potential maximum reward amount that can be collected if the MVP(s) completes the bonus gameplay session perfectly (collects all possible rewards) through conclusion. Additionally, in some embodiments, the bonus gameplay application prompts the non-MVP players with a message stating "If you leave now, you will be missing up to Y currencies." wherein Y is defined as the potential maximum reward amount that can be collected if the non-MVP players completes the bonus session perfectly (by hindering or assisting the MVP at all possible gameplay instances and thereby collecting all possible rewards) through conclusion.

VGS Application 120

Figure 2:
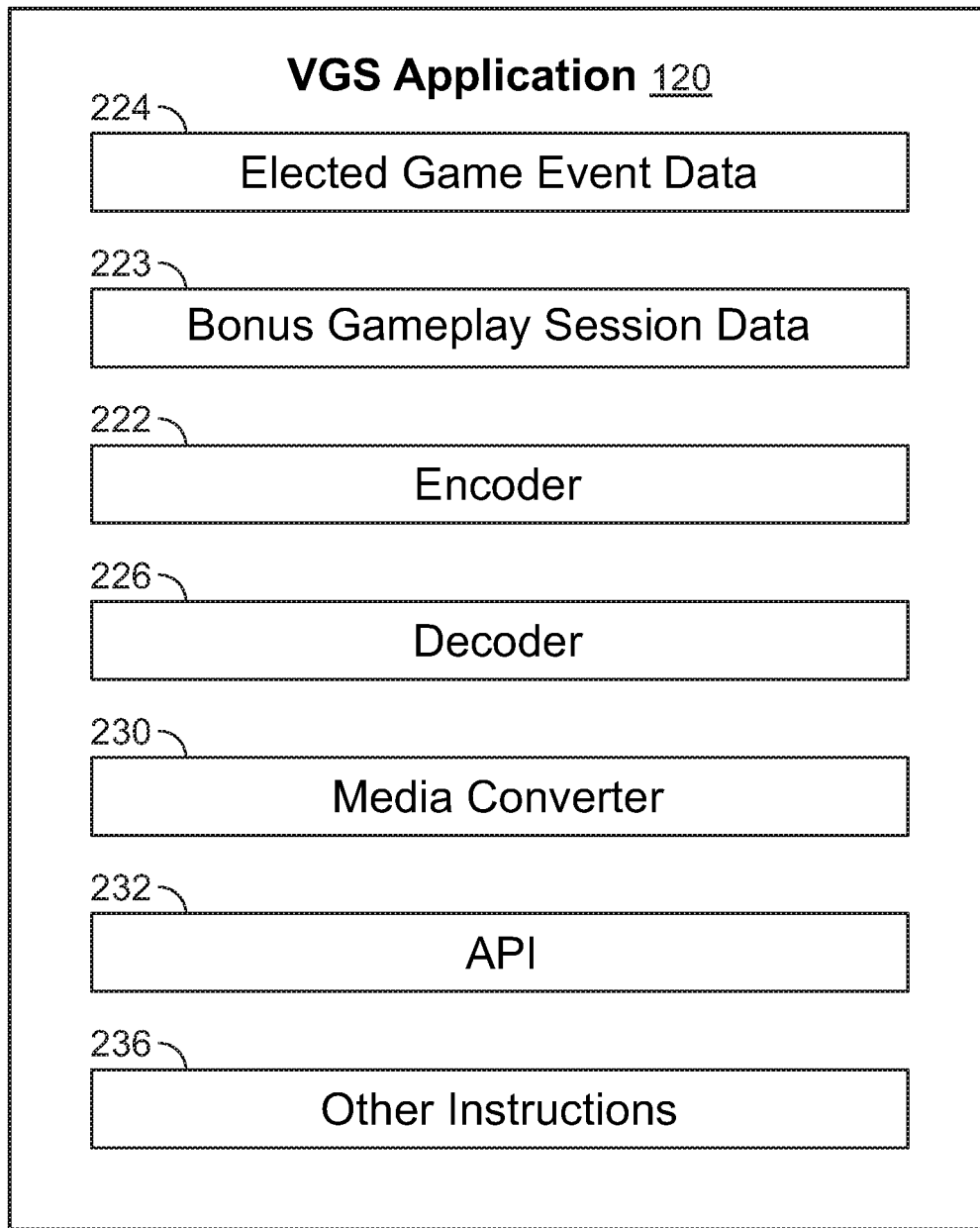
FIG. 2 is a block diagram of a video game stream (VGS) application, according to an embodiment of the specification.

FIG. 2 depicts a block diagram of a VGS application (shown as 120 in FIG. 1A), according to an implementation of the present specification. Referring to FIGS. 1A and 2 simultaneously, the instructions of VGS application 120 may include, without limitation, a VGS encoder 222, elected game event data 224, bonus gameplay session data 223, a VGS decoder 226, a media converter 230, an Application Programming Interface ("API") 232, and/or other instructions 236 that program computer system 110 to perform various operations, each of which are described in greater detail herein. As used herein, for convenience, the various instructions will be described as performing an operation, when, in fact, the various instructions program the processors 112 and therefore computer system 110, both shown in FIG. 1, to perform the operation.

In an implementation, VGS encoder 222 may obtain elected game event data 224, as further described below, and integrate the elected game event data with a bonus gameplay session data 223 that is conventionally generated by the computer system 110. In embodiments of the present specification, the conventional bonus gameplay data refers to the gameplay provided as a bonus, specifically, to one or more of players who have performed better than other players, also termed as the Most Valuable Player(s) (MVP(s)). VGS encoder 222 may assign an identifier to the obtain elected game event data and store the elected game event data and its corresponding identifier (as well as any video game information) in a VGS database, such as a database 130. Elected game event data 224 may be persistently stored in the VGS database 130 for later search and retrieval. In this manner, elected game event data of interest may be searched for or otherwise obtained.

In an implementation, optional VGS decoder 226 may obtain a VGS and decode the VGS to provide the bonus gameplay session with integrated elected game event data. VGS decoder 226 may include (or be part of) the game engine, in which case VGS decoder 226 may be specific for a particular game or set of games for which the game engine provides gameplay. In other instances, VGS decoder 226 may be generic to different types of game engines (and therefore different types of games), in which case VGS decoder 226 may identify an appropriate game engine to use to read the elected game event data and gameplay session data to provide the bonus gameplay session. VGS decoder 226 may use the identifying information to identify an appropriate game engine to use.

Media converter 230 may generate the visual and auditory display of the bonus gameplay session (e.g., using VGS decoder 226) and then convert the playback to a conventional gaming media format. Such conversion may occur via server-based processing (e.g., on computer system 110), distributed processing using end user devices 140, cloud services processing (e.g., via cloud computer systems), and/or through other computer processing techniques.

In an implementation, API 232 may provide access to the elected game event data 223 to facilitate sharing of elected game events 223. For instance, a user may, through end user device 140, request to share an elected game event from a bonus gameplay session being played or already played. In embodiments of the present specification, the bonus gameplay session is made available to one or more MVPs of a gameplay session preceding the bonus gameplay. API 232 may share the elected game event data 223, in any format described herein, to social sharing networks (e.g., YouTube™, Facebook™, Instagram™ or any other social media network platform). Although described herein as relating to a video game session for convenience, the elected game event data 223 may relate to a continuous type of game (e.g., a virtual world simulation) that has no discrete ending. In these instances, the elected game event data 223 may refer to a segment of time during a portion of the continuous bonus game, as well as specific events in the course of the bonus game.

Figure 3:
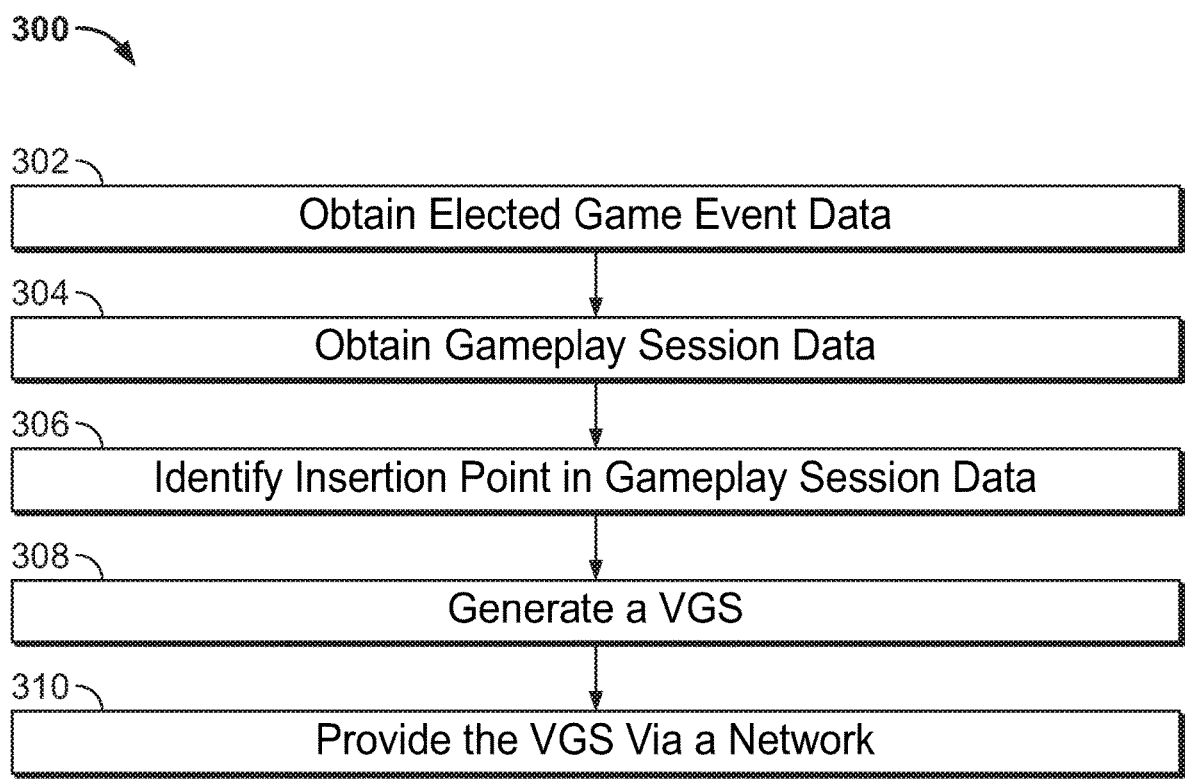
FIG. 3 is a flowchart depicting a process of generating a video game stream, according to an embodiment of the specification.

FIG. 3 depicts a process 300 of generating a video game stream, according to an implementation of the present specification. The various processing steps and/or data flows depicted in FIG. 3 (and in the other drawing figures) are described in greater detail herein. The described steps may be accomplished using some or all of the system components described in detail above and, in some implementations, various steps may be performed in different sequences and various steps may be omitted. Additional steps may be performed along with some or all of the steps shown in the depicted flow diagrams. One or more steps may be performed simultaneously. Accordingly, the steps as illustrated (and described in greater detail below) are exemplary by nature and, as such, should not be viewed as limiting.

Referring to FIG. 3, in the first step 302, process 300 includes obtaining elected game event data, the generation of which is described below. The elected game event data may be obtained from a game engine substantially in real-time as the bonus gameplay session is occurring or the elected game event data may be pre-stored and introduced at some later point in time as the bonus gameplay is occurring. Process 300 may be performed by a game engine or a system component separate from the game engine, in which case the system component may obtain the elected game event data directly or indirectly from the game engine. The elected game event data may include or be associated with identifying information.

In the next step 304, bonus gameplay session data is obtained from the game engine and, in step 306, an insertion point is identified in the bonus gameplay session data, at which point the elected game event data is overlaid, inserted, or otherwise integrated with the conventionally generated bonus gameplay session data. It should be appreciated that, alternatively, a game engine may generate bonus gameplay session data with the elected game event data 302 already incorporated, integrated, or combined therein, thereby eliminating a separate integration step. Accordingly, the VGS, or portions thereof, is configured to obtain elected game event data 302, as identified by an identifier, and overlay, insert, or otherwise integrate it with a secondary data stream (conventional gameplay session data) to generate a final video game stream that is communicated to client devices.

The next step 308 comprises generating a VGS of the complete bonus gameplay session with both the bonus gameplay session data and the elected game event data incorporated therein. Subsequently, at step 310, the VGS is transmitted to end user devices via a network. The end user device may then process the VGS to generate the bonus gameplay session in real-time.

Generating Elected Game Event Data Based On Non-MVP Player Input

Bonus gameplay sessions awarded to MVP(s) of a preceding multi-player gaming session may be a single player game such as a racing game, a puzzle game, or a platformer while the preceding multi-player gameplay may have been a sports game, a First Person Shooter (FPS) game, a racing game, or a game of any other genre. The MVP(s) may be a single player, multiple players, or a team of players from a winning team of the preceding gameplay session. In some embodiments, where teams have played in the preceding multi-player game, the following bonus gameplay session is offered to a single MVP. In this embodiment, the non-MVP players may include opponents from teams other than the team of the MVP, who may elect bonus gameplay events to stop the MVP. The non-MVP players may additionally include the MVP's teammates who elect gameplay events that help the MVP. For example, non-MVP player opponents may try to distract the MVP, while non-MVP player teammates may give the MVP power-ups, boosts, or otherwise nullify the opponents' attacks.

In some embodiments, prior to the standard multi-player gameplay session, all the players are given the option to preselect certain equipment or items to be used during the bonus gameplay session. In an example, players may select a particular type of armor, weapon, vehicle, power-up, or any other object, which could be used in the event that that player earns the MVP spot. Besides weapons or power-ups, the player could also select a level to be used in the bonus round should the player earn the MVP spot. In some embodiments, the players are not informed about the type of the bonus gameplay that they may reach, thereby providing an element of surprise/chance to their selections of weapons, power-ups, and other types of objects. In yet other embodiments, the players are informed prior to the gameplay about the type of bonus gameplay they could expect. In some embodiments, after the multi-player gameplay session, the MVP is provided with options to select a type of bonus gameplay.

As discussed above, in bonus gameplay offered to the MVP(s), non-MVP players may participate in, and contribute toward, the bonus gameplay session by voting on the occurrence of gameplay events, thereby generating elected game event data. For example, in an action or combat game where random weapons are generated from time to time, non-MVP players may vote for the type of weapon that will appear next. Other examples of elements player-spectators could vote on include, but are not limited to, the occurrence of natural disasters or other "acts of God" (e.g., earthquakes, meteor showers, storms, rain, wind, fires, lightning, or other natural disasters), the occurrence of available items for purchase during a bonus gameplay session, the timing and content of supplies and rewards, the placement or existence of armor, weapons, treasure, or other resources, the placement or existence of hazards, threats, or challenges, the placement or existence of random destructive events, whether any of the above are applied to, or made available to, specific players and changes in the layout of the bonus game map, for example, in a large map, certain areas may be removed or closed to access such as by removing a bridge, locking a door, or placing an obstacle, such as fallen trees or a building, to block a path, among other options. In some embodiments, the MVP(s) may also vote on the occurrence of gameplay events. In some embodiments, voting occurs only before the start of bonus gameplay. In other embodiments, voting occurs only during bonus gameplay. In other embodiments, voting occurs both before and during bonus gameplay.

Figure 4:
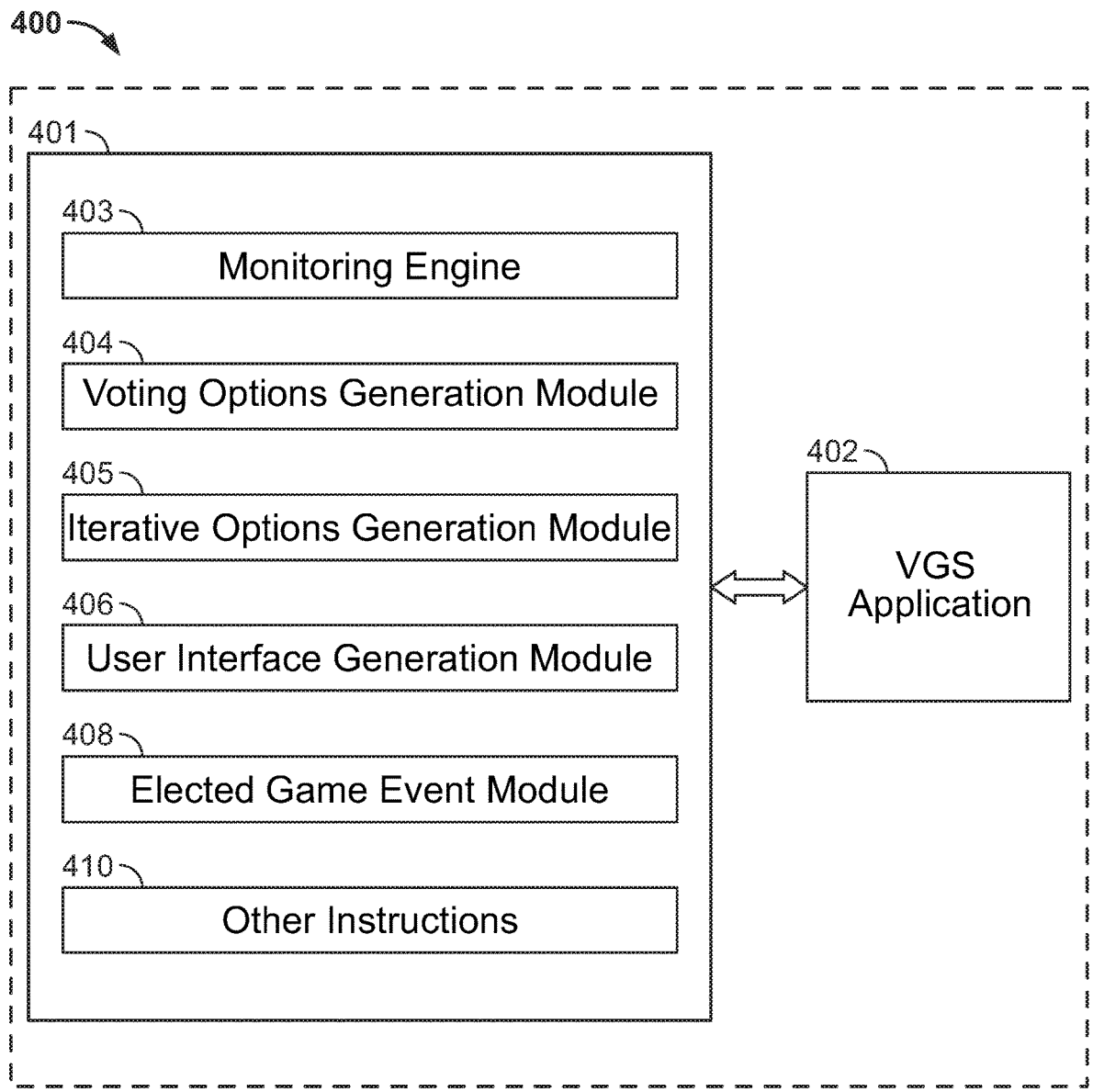
FIG. 4 is a block diagram illustrating the components of a non-MVP player participation system, according to an embodiment of the present specification.

FIG. 4 is a block diagram illustrating the components of a non-MVP player participation system 400, according to an embodiment of the present specification. Referring to FIG. 4, in one embodiment, the system 400 comprises a Non-MVP Player Input application 401, which is in communication with a VGS application 402 (shown as 120 in FIG. 1A and FIG. 2), such that the content selected by non-MVP players, namely the elected game event data, may be incorporated into a video game stream (VGS). The instructions of Non-MVP Player Input application 401 may include, without limitation, a monitoring engine 403, a voting options generation module 404, an iterative options generation module 405, a user interface generation module 406, an elected game event module 408, and/or other instructions 410 that program computer system (110 of FIG. 1A) to perform various operations, each of which are described in greater detail herein. As used herein, for convenience, the various instructions will be described as performing an operation, when, in fact, the various instructions program the processors 112 and therefore computer system 110, both shown in FIG. 1, to perform the operation.

Monitoring Engine

Referring to FIG. 4, the Non-MVP Player Input application 401 comprises a monitoring engine 403. The monitoring engine 403 is configured to monitor a number of on-line access streams, each of the on-line access streams being representative of a client device that is watching a gameplay session. In one embodiment, the non-MVP players include all players other than the MVP(s) who played in the preceding multi-player game. Any spectators watching a gameplay session are considered non-players and are not included in the selection process for MVP(s) and non-MVP players and therefore, cannot be the MVP(s) or a non-MVP player. In one embodiment, options to elect one or more game events during a gameplay session are triggered only when the number of non-MVP players meets or exceeds a threshold number. In one embodiment, the number of non-MVP players, represented by one or more data streams associated with unique or distinct MAC addresses, is monitored in real time, thereby allowing the system to determine if a threshold number of non-MVP players is available. In an embodiment, the threshold number is at least one non-MVP player.

In some embodiments, a threshold number of non-MVP player votes may be different for different types or categories of game event options. In an embodiment, the game event options may be categorized based on the severity of their effect on the bonus gameplay. For example, a game event option of selecting a weapon may require at least X % of votes from the non-MVP players whereas a game event option of generating a natural disaster may require at least Y % of votes, wherein Y % is greater than X % since the natural disaster has a more severe impact on the gameplay compared to the weapon being incorporated into the bonus gameplay. In some embodiments, the severity of the effect of an elected game event option, on a bonus gameplay, may increase with increasing number of percentage of votes. For example, at least 75% votes may be needed to incorporate an earthquake in the bonus gameplay, but the severity of the earthquake may scale up with the voting percentage such that a 99% vote may trigger a major earthquake in the bonus gameplay. Stated differently, game event options have differing levels of severity and an engine, as further described below, may require game event options of higher levels of severity to have a higher threshold number of non-MVP player votes as compared to game event options of lower levels of severity.

In one embodiment, the feature of selecting events based on non-MVP player input is available to non-MVP players participating in a bonus gameplay session remotely on their devices, as well as to a live audience participating in a bonus game at a competitive video gaming event or e-sports event.

Figure 5:
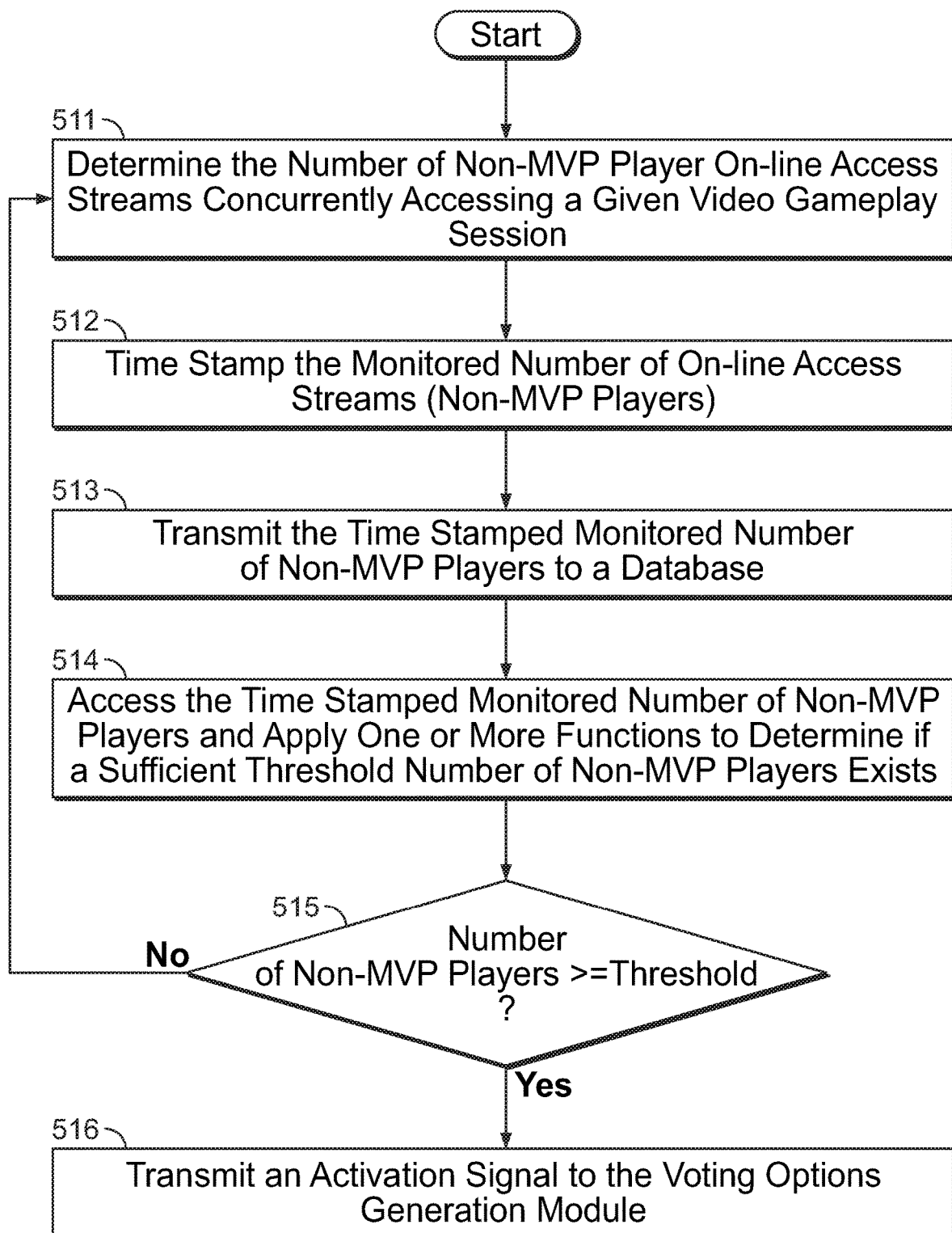
FIG. 5 is a flowchart illustrating the operation of a monitoring engine, according to one embodiment of the present specification.

FIG. 5 is a flowchart illustrating the operation of the monitoring engine. Referring to FIG. 5, in conjunction with FIG. 4, in the first step 511 the monitoring engine 403 determines, on an on-going and real-time basis, using a first plurality of programmatic instructions, the number of non-MVP player on-line access streams that are concurrently accessing a given bonus gameplay session. The first plurality of programmatic instructions may also be configured to receive data indicative of the number of non-MVP players participating in the bonus gameplay session in person, as opposed to via on-line access streams.

In the next step 512, using a second plurality of programmatic instructions, the monitoring engine 403 time stamps the monitored number of on-line access streams and/or number of non-MVP players watching the bonus gameplay session in person (collectively, the monitored non-MVP players). Optionally, the monitoring engine 403 additionally sorts the time-stamped non-MVP players into one or more categories comprising all players other than MVP(s) from the preceding game, all players other than MVP(s) from a team of the MVP(s) in the preceding game, and all players other than MVP(s) from an opposing team of the MVP(s) in the preceding game. Next, in step 513, the system transmits the time stamped monitored number of non-MVP players to a database for storage. Next, in step 514, using a third plurality of programmatic instructions, the monitoring engine 403 accesses the time stamped monitored number of non-MVP players and applies one or more functions to determine if and when a sufficient number of non-MVP players exists in order to trigger the non-MVP player participation system 400, as described below. In one embodiment, the one or more functions may include averaging the time stamped monitored number of non-MVP players over a predefined period of time and, if the averaged time stamped monitored number of non-MVP players meets or is above a predefined number or threshold number, as shown in steps 515 and 516, the monitoring engine 403 transmits an activation signal to the voting options generation module 404, described below. If the averaged time stamped monitored number of non-MVP players does not meet or is not above a predefined number, the monitoring engine 403 does not transmit an activation signal to the voting options generation module and, instead, continues monitoring the number of non-MVP players. Accordingly, non-MVP player inputs selectable by means of votes are available only when there are sufficient or threshold numbers of non-MVP players participating in or watching the bonus gameplay session. In an embodiment, the threshold number is at least one non-MVP player.

Voting Options Generation Module

Referring back to FIG. 4, once the monitoring engine 403 recognizes that a sufficient or threshold number of non-MVP players are available as described above, the voting options generation module 404 in the Non-MVP Player Input application 401 determines a plurality of game event options related to future events of bonus gameplay that are to be presented to the non-MVP players for voting. In some embodiments, the game event options are related to dynamic events, depending upon a state and/or course of bonus gameplay, in addition to future events of bonus gameplay. Accordingly, different instances of the same point in the same level of a game may lead to different game event options based upon the historical success of one or more MVPs, the experience level of one or more MVPs, the average experience level of all MVPs, the health level of one or more MVPs, the average health level of all MVPs, the weapons possessed by one or more MVPs, the number of kills of one or more MVPs achieved in the preceding gameplay, the average number of kills of all MVPs achieved in the preceding gameplay, or any other metric taken individually, collectively, or some other function thereof.

In one embodiment, non-MVP players may vote to assist or hinder one, some, or all the MVPs playing in an ongoing bonus gameplay session. Their vote may be used to change the status of or affect the health, damage, speed, armor, weapons, skills, items, spells, and other items or attributes available to one or more MVPs. It may be noted however, that such events that can be decided by the non-MVP players' votes are generated by the voting options generation module 404 such that these events have the potential to affect all MVPs equally and keep the bonus gameplay session fair. That is, the generation of these game event options is preferably designed such that a true randomized, non-biased and neutral gaming environment is achieved. The occurrence of events and the gaming environment is designed with boundaries such that extremes of disincentives and excess incentives are avoided. Accordingly, in one embodiment, the voting options generation module 404 evaluates if one or more game event options would cause a degree of disincentive exceeding a threshold level or a degree of positive incentive exceeding a threshold level based on, for example, at least one of a historical analysis of such game events from other games or a comparison of the game event option to the results of other game event options which had been implemented in the same game.

In one embodiment, the voting options generation module 404 uses a plurality of instructions to execute multiple methods by which game event options will be drawn, preferably randomly, during a gameplay session. In one embodiment, pseudo-random number generators (PRNGs) are executed to draw game event options. Non-limiting examples of PRNGs comprise Linear Congruential Generator, Middle Square Weyl Sequence PRNG, and Mersenne Twister based PRNG. According to one aspect of the present system for example, the voting options generation module 404 may use a plurality of instructions to draw events from multiple groups, with each group having a fixed probability of being selected. According to another aspect, the voting options generation module 404 may use a plurality of instructions to select an event group via a "counter value" method, wherein the maximum number of draws allowed is set before a given group of events is chosen. The probability of generating an event from the group in a smaller number of draws than the maximum is set to be independent of the draw number. In an embodiment of the counter value method for example, the voting options generation module 404 uses a mathematical formula to ensure that each event has an equal chance of being selected to be put up for voting. In another embodiment, the voting options generation module 404 initializes the draw numbers for events such that unusually poor events are not successively generated in a game. Thus, the voting options generation module 404 ensures that the timing and delivery of an event for selection by vote is done in a manner that takes fairness and randomness into account.

In one embodiment, randomness and fairness in the game is ensured by the type of events that are generated by the voting options generation module 404 and presented as options to the non-MVP players for voting. In some embodiments, where the monitoring engine 403 has categorized the non-MVP players into different types, the voting option generation module 404 limits the voting options provided to each category of non-MVP players. As a result, players other than the MVP(s) who were teammates of the MVP(s) may vote on certain choices of game events, players other than the MVP(s) who were from an opposing team of the MVP(s) may vote on certain other choices of game events, and spectators who were not players in the preceding gameplay may vote on still other choices of game events. Therefore, the helpful and hindering game events may be voted on independently of each other. For example, in a bonus gameplay where an MVP is racing a car through a level. In this example, the opponents may vote on the type of hindrance (e.g., a bomb vs. oil slick) and the teammates may independently vote on some type of help (e.g., a speed boost or shield). In other examples, the teammates and opponents may not be voting but are rather interactively affecting in the gameplay. For example, in the racing scenario, the opponents have the ability to throw objects at the MVP's vehicle by voting and pre-equipping items (e.g., bombs) to throw. In this example, the teammates are able to protect the MVP by swiping or deflecting the objects away.

Additionally, in some embodiments, the MVP(s) may communicate with non-MVP players (e.g., teammates from the prior multi-player game) to ask for support in voting/choosing bonus game options. In some embodiments, communication is disabled for the MVP(s) at least after completion of the multi-player game and/or during an ongoing bonus gameplay session. Communication, for example, text and voice communication, is disabled during the bonus gameplay, so that the MVP(s) is unable to solicit votes from supporters. The supporters may include, for example, teammates of the MVP(s) from the preceding gameplay.

In one embodiment, competing players are provided with notice of a forthcoming elected game event after the non-MVP players' votes have been tallied, to allow them time to prepare for the elected game event. For example, if the non-MVP players vote for a natural disaster, such as an earthquake, the MVP(s) may receive a notification that an earthquake will strike within 2 minutes or some other time frame.

In some embodiments, the voting options generation module 404 segments non-MVP players into, at least, a first group that is provided access to a first set of game event options and into a second group that is provided access to a second set of game event options, where the first set of game event options is different from the second set of game event options, and where the segmentation is based upon attributes, profile elements, or other characteristics of the non-MVP players themselves. In an embodiment, the voting options generation module 404 determines if a non-MVP player is a supporter of the MVP(s), where a teammate of the MVP(s) from the preceding gameplay may be considered a supporter.

Iterative Options Generation Module

The Non-MVP Player Input application 401 further comprises an iterative game event options generation module 405 which uses a plurality of instructions to iteratively generate new options for game events that can be selected by non-MVP player vote. In one embodiment, the new options generated by the iterative options generation module 405 depend on at least one of a plurality of factors such as, but not limited to, the course of the game, namely how the bonus gameplay progresses, the historical options presented to and/or selected by the non-MVP players, number of MVPs, how far the game has progressed, time left in game. In one embodiment, the new options are generated by the iterative options generation module 405 in real-time, as the game is played. For example, if one or more of previous events selected by vote have caused one of the MVPs to considerably enhance their strength, the iterative options generation module 405 may execute a plurality of instructions to generate new options which provide the non-MVP players a chance to vote for an event that enhances the hurdles or difficulties faced by the MVPs. As another example, if an event causes "heavy rain" in the game, subsequent options generated by the iterative options generation module 405 may allow the non-MVP players to select "flooding" of one or more areas on the bonus game map, thereby making it inaccessible to all MVPs of the game. Thus, the iterative options generation module 405 provides voting options in line with prior events and the course of the game. In one embodiment, the iterative options generation module 405 determines a plurality of additional game event options based on inferred non-MVP player interest. Thus, for example, if a majority of non-MVP players appear to prefer a particular maneuver in a combat based game, as inferred from non-MVP player votes and other data, the iterative options generation module 405 may generate similar maneuvers as one of the plurality of game event options to the non-MVP players in future.

User Interface Generator

After determining the options for gameplay events on which non-MVP players can vote, the user interface generator module 406 in the Non-MVP Player Input application 401 uses a plurality of instructions to generate a user interface in the client device of non-MVP players that presents the plurality of game event options to the non-MVP players and allows them to select one of the plurality of game event options at various points in time during the bonus gameplay, using their devices.

In an embodiment, the Non-MVP Player Input application 401 communicates with the VGS application 402 to generate a user interface with voting options on the client devices, in accordance with the instructions executed by the user interface generator module 406. In an embodiment, the user interface is generated at the end user device(s) by the VGS decoder (referred as 226 in FIG. 2). The user interface thus generated by the VGS decoder may be overlaid on the bonus gameplay session, for the non-MVP players, and may include hotspots or other interactive elements configured to receive non-MVP players' inputs. Operationally, the VGS decoder 226 causes a user interface with selectable inputs to be provided at the client device, in accordance with the plurality of instructions executed by the voting options generation module 404 and the user interface generator module 406, that allow a user to specify which of the plurality of game event options should be integrated into the bonus gameplay session. In a voting system, the choices of all the non-MVP players are communicated through the user interface to the game engine, and the votes are tallied to determine which of the plurality of game event options will constitute an elected game event and, therefore, be used in the bonus gameplay session.

The elected game event module 408 is configured to receive, from non-MVP players' client devices, data indicative of which of the plurality of game event options has been selected by the non-MVP players. The elected game event module 408 is preferably in communication with one or more databases to store the number, timing, and association of each vote with specific non-MVP players relative to each of the plurality of game event options. The elected game event module 408 further determines which of the plurality of game event options receives enough votes to warrant being incorporated into a bonus gameplay session and, therefore, constitute an elected game event. The determination of which of the plurality of game event options receives enough votes to warrant being incorporated into a bonus gameplay session is achieved by comparing the number of votes to one or more threshold values.

Using the VGS Application for Incorporating Selected Events into the Video Game Stream In an embodiment, the Non-MVP Player Input application 401 communicates with the VGS application 402 to generate a user interface with voting options on non-MVP player client devices. Referring to FIG. 4 in conjunction with FIG. 2, while the VGS decoder (referred as 226 in FIG. 2) in the VGS application causes a user interface with selectable inputs to be provided at the client device, the VGS encoder (referred as 222 in FIG. 2) is configured to accept user-provided content from the end user device(s). In one embodiment, VGS encoder 222 may include an input interface configured to receive voting inputs from non-MVP player end user devices. In one embodiment, the VGS application 402 includes a communication module, which is configured to obtain voting inputs and/or action requests from the non-MVP players, via the user interface, and transmit it to the VGS encoder for implementation.

Figure 6:
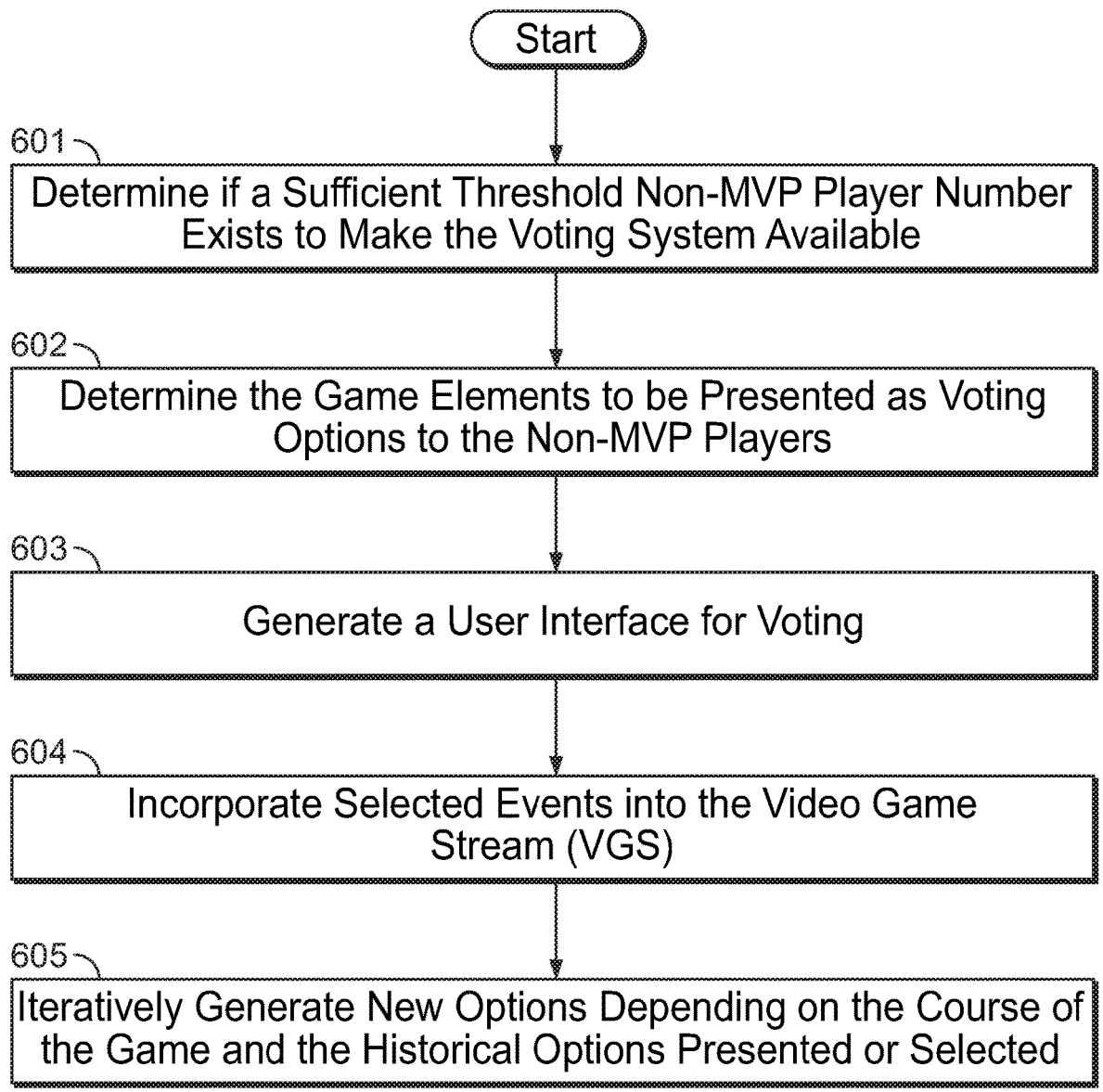
FIG. 6 is a flowchart illustrating an exemplary method of incorporating spectator inputs into gameplay, according to one embodiment of the present specification.

FIG. 6 is a flowchart summarizing an exemplary method of incorporating non-MVP player inputs into bonus gameplay, using the non-MVP player participation system of FIG. 4, in accordance with embodiments of the present specification. Referring to FIG. 6 in conjunction with FIG. 4, in the first step 601, the monitoring engine 403 of the Non-MVP Player Input application 401 determines if and when a sufficient threshold non-MVP player number exists in order to make the voting system available. That is, non-MVP player inputs selectable by means of votes are available only when there are sufficient or threshold numbers of non-MVP players participating in or watching the gameplay. For this purpose, in one embodiment, the number of non-MVP players is monitored in real time. Optionally, the monitoring engine 403 also determines a segment or type of each non-MVP player, based on their profile and nature of participation in a previous gameplay session. In the next step 602, after it is determined that a sufficient non-MVP player number exists, the voting options generation module 404 of the Non-MVP Player Input application 401 determines the plurality of game event options that are to be presented as voting options to the non-MVP players. In some embodiments, the voting options vary for each segment or type of non-MVP player. In the next step 603, the user interface generator 406 causes a user interface associated with the voting options to be generated on the end-user client devices, by means of the VGS from the VGS application 402. The user interface puts forward various selectable options to the non-MVP players and allows them to select one of the multiple options at various points in time during the bonus gameplay. In the next step 604, the game events corresponding to the options selected by majority vote of the non-MVP players is incorporated into the video game stream (VGS) at the appropriate time, which is enabled by the VGS application, as described above. In one embodiment, the system iteratively generates new options for game events that can be selected by non-MVP player votes depending on the course of the game, as the game is played, and the historical options presented and/or selected, as shown in step 605.

In some embodiments of the present specification, the bonus gameplay session incentivizes the MVP(s) in the form of recognition, providing brag rights, allocating points or rewards which may be distributed using a digital distribution system, such as by automatically allocating a reward to the game account of an MVP, or using a physical distribution system.

In one embodiment, non-MVP player inputs obtained from the non-MVPs participating in a match live may be used to select the view of the bonus gameplay being streamed or broadcast. A VGS may comprise multiple camera angles or perspectives of a bonus gameplay session. In one embodiment, non-MVP players may be allowed to select one of several different views of the bonus gameplay session, including an aerial view, a first-person-view of a particular MVP in a game with multiple MVPs, or a side perspective view of the bonus gameplay session. In one embodiment, the collective choice of the audience, as represented by majority non-MVP players' votes, may be used as a basis for selecting a particular viewpoint to be displayed on an e-sports broadcast or live stream of the gameplay session. In one embodiment, the non-MVP players who are able to vote include the live audience, who may vote using an app or a user device, as well as remote audience who may vote using the device they are viewing the gameplay session on. In some embodiments, this feature is only available to a live audience, in order to encourage live participation in the gaming events. It may be appreciated that a VGS may comprise a plurality of different tracks, thereby enabling non-MVP players to choose which track to use, effectively enabling non-MVP players to toggle between different views.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method for generating a gameplay session and incorporating inputs from a second set of players into the gameplay session being played by at least one first player, wherein each of the second set of players is permitted to spectate, but not permitted to play in, the gameplay session, wherein the gameplay session is at least partially generated by a computer system and at least partially transmitted to a plurality of end user devices and wherein the computer system includes one or more processors executing a video game streaming application for generating and streaming the gameplay session, the method comprising:

categorizing each of the second set of players into a type of player;

based on said categorization, generating game event options, wherein each of the game event options is specific to the type of player and wherein different game event options are generated for different types of players;

transmitting data indicative of a user interface to at least some of the end user devices, wherein, when executed by at least some of the end user devices, the user interface presents the generated game event options specific to the type of player;

receiving inputs indicative of a desire to include at least one of the game event options into the gameplay session;

selecting at least one of the game event options based on a function of the inputs; and incorporating the selected game event options into a data stream representative of the gameplay session.

2. The method of claim 1, wherein the type of player comprises a former teammate of the first player.

3. The method of claim 1, wherein the type of player comprises a person who was on a team opposing the first player.

4. The method of claim 1, wherein the type of player comprises a person who was a spectator.

5. The method of claim 1, wherein the game event options include an occurrence of one or more earthquakes, meteor showers, storms, rain, wind, fires, lightning, other natural disasters, or an occurrence of available items for purchase during the gameplay session.

6. The method of claim 1, wherein the game event options include a timing and content of supplies and rewards available to the first player in the gameplay session.

7. The method of claim 1, wherein the game event options include a placement or existence of armor, weapons, treasure, or other resources available to the first player in the gameplay session, or a placement or existence of hazards, threats, or challenges presented to the first player in the gameplay session.

8. The method of claim 1, wherein the game event options include changes in a layout of a game map in the gameplay session.

9. The method of claim 1, wherein the game event options are randomly generated.

10. The method of claim 1, further comprising iteratively generating new game event options depending on events occurring within the gameplay session and the selected game event options previously incorporated into the data stream representative of the gameplay session, wherein iteratively generating the new game event options include generating game event options that were not historically presented to the second set of players.

11. A system for generating a gameplay session and incorporating inputs from a second set of players into the gameplay session being played by at least one first player, wherein each of the second set of players is permitted to spectate, but not permitted to play in, the gameplay session, the system comprising:

a computer system for at least partially generating the gameplay session and at least partially transmitting the generated gameplay session to a plurality of end user devices, wherein the computer system comprises one or more processors executing a video game streaming application for generating and streaming the gameplay session and wherein at least one of the one or more processors is configured to:

categorize each of the second set of players into a type of player;

based on said categorization, generate game event options, wherein each of the game event options is specific to the type of player and wherein different game event options are generated for different types of players;

transmit data indicative of a user interface to at least some of the end user devices, wherein, when executed by at least some of the end user devices, the user interface presents the generated game event options specific to the type of player;

receive inputs indicative of a desire to include at least one of the game event options into the gameplay session;

select at least one of the game event options based on a function of the inputs; and incorporate the selected game event options into a data stream representative of the gameplay session.

12. The system of claim 11, wherein the type of player comprises a former teammate of the first player.

13. The system of claim 11, wherein the type of player comprises a person who was on a team opposing the first player.

14. The system of claim 11, wherein the type of player comprises a person who was a spectator.

15. The system of claim 11, wherein the game event options include an occurrence of one or more earthquakes, meteor showers, storms, rain, wind, fires, lightning, other natural disasters, or an occurrence of available items for purchase during the gameplay session.

16. The system of claim 11, wherein the game event options include a timing and content of supplies and rewards available to the first player in the gameplay session.

17. The system of claim 11, wherein the game event options include a placement or existence of armor, weapons, treasure, or other resources available to the first player in the gameplay session, or a placement or existence of hazards, threats, or challenges presented to the first player in the gameplay session.

18. The system of claim 11, wherein the game event options include changes in a layout of a game map in the gameplay session.

19. The system of claim 11, wherein the game event options are randomly generated.

20. The system of claim 11, wherein the at least one of the one or more processors is further configured to iteratively generate new game event options depending on events occurring within the gameplay session and the selected game event options previously incorporated into the data stream representative of the gameplay session, wherein iteratively generating the new game event options include generating game event options that were not historically presented to the second set of players.

\* \* \* \* \*